US012612296B2

(12) United States Patent
Njaastad et al.

(10) Patent No.: US 12,612,296 B2
(45) Date of Patent: Apr. 28, 2026

(54) COLD PLATE PRECHILL CIRCUIT

(71) Applicant: Marmon Foodservice Technologies, Inc., Osseo, MN (US)

(72) Inventors: David Njaastad, Palatine, IL (US); Zachary Dresser, Batavia, IL (US); Luis Campos, Cicero, IL (US)

(73) Assignee: Marmon Foodservice Technologies, Inc., Osseo, MN (US)

(*) Notice: Subject to any disclaimer, the term of this patent is extended or adjusted under 35 U.S.C. 154(b) by 194 days.

(21) Appl. No.: 18/433,071

(22) Filed: Feb. 5, 2024

(65) Prior Publication Data

US 2024/0262671 A1 Aug. 8, 2024

Related U.S. Application Data

(60) Provisional application No. 63/483,652, filed on Feb. 7, 2023.

(51) Int. Cl.

| | |
|---|---|
| ***B67D 1/00*** | (2006.01) |
| ***B67D 1/08*** | (2006.01) |
| ***F25D 31/00*** | (2006.01) |

(52) U.S. Cl.

CPC ........... *B67D 1/007* (2013.01); *B67D 1/0027* (2013.01); *B67D 1/0064* (2013.01); *B67D 1/0065* (2013.01); *B67D 1/0889* (2013.01); *F25D 31/001* (2013.01); *B67D 2001/0094* (2013.01); *B67D 1/0882* (2013.01); *B67D 2210/00049* (2013.01); *B67D 2210/00157* (2013.01)

(58) Field of Classification Search

CPC .... B67D 1/007; B67D 1/0027; B67D 1/0064; B67D 1/0065; B67D 1/0889; B67D 1/0882; B67D 2001/0094; B67D 2210/00049; B67D 2210/00157; F25D 31/001

See application file for complete search history.

(56) References Cited

U.S. PATENT DOCUMENTS

| | | | | |
|---|---|---|---|---|
| 4,678,104 A * | 7/1987 | Pritchett | B67D 1/0857 | 165/169 |
| 5,230,448 A * | 7/1993 | Strohmeyer | F25C 5/24 | 222/413 |
| 5,249,710 A | 10/1993 | Hassell | | |
| 5,319,947 A * | 6/1994 | Fischer | B67D 1/0857 | 62/389 |
| 5,350,086 A | 9/1994 | Martin | | |
| 5,433,348 A | 7/1995 | Deering | | |
| 5,487,492 A | 1/1996 | Goulet | | |
| 5,829,646 A | 11/1998 | Schroeder | | |

(Continued)

FOREIGN PATENT DOCUMENTS

| | | |
|---|---|---|
| AU | 2006200803 A1 | 3/2006 |
| WO | 2020160420 A1 | 8/2020 |

OTHER PUBLICATIONS

Extended European Search Report for European Patent Application No. 24156287.5, dated Jun. 18, 2024.

*Primary Examiner* — David J Teitelbaum

(74) *Attorney, Agent, or Firm* — Andrus Intellectual Property Law, LLP

(57) ABSTRACT

A cold plate includes a cold plate body. A tubing system is embedded within the cold plate body. The tubing system includes a prechill circuit, a plain water postchill circuit fluidly connected to the prechill circuit, and a carbonated water postchill circuit fluidly connected to the prechill circuit.

14 Claims, 8 Drawing Sheets

(56) References Cited

U.S. PATENT DOCUMENTS

| | | | | |
|---|---|---|---|---|
| 5,987,900 | A * | 11/1999 | Love | F25C 5/185 62/348 |
| 6,045,007 | A | 4/2000 | Simmons | |
| 6,155,069 | A | 12/2000 | Quartarone | |
| 6,463,753 | B1 | 10/2002 | Haskayne | |
| 6,505,758 | B2 | 1/2003 | Black | |
| 6,574,981 | B2 | 6/2003 | Schroeder | |
| 6,626,005 | B2 | 9/2003 | Schroeder | |
| 6,698,229 | B2 * | 3/2004 | Renken | B67D 1/0861 222/129.1 |
| 6,712,342 | B2 | 3/2004 | Bosko | |
| 6,761,036 | B2 | 7/2004 | Teague | |
| 6,880,358 | B2 | 4/2005 | Lucas | |
| 6,945,070 | B1 * | 9/2005 | Jablonski | B67D 1/0871 62/394 |
| 7,287,671 | B2 | 10/2007 | Morrow, Sr. | |
| 7,624,895 | B2 | 12/2009 | Haskayne | |
| 7,641,074 | B2 | 1/2010 | Edwards | |
| 7,757,498 | B2 | 7/2010 | Wolski | |
| 7,793,678 | B2 | 9/2010 | Edwards | |
| 8,074,842 | B2 | 12/2011 | Edwards | |
| 8,251,259 | B2 | 8/2012 | Edwards | |
| 8,365,956 | B2 | 2/2013 | Edwards | |
| 8,365,957 | B2 | 2/2013 | Edwards | |
| 8,485,394 | B2 | 7/2013 | Tachibana | |
| 8,490,834 | B2 | 7/2013 | Edwards | |
| 9,061,881 | B2 * | 6/2015 | Brown | B67D 1/006 |
| 9,085,451 | B2 | 7/2015 | Santy | |
| 9,718,035 | B2 | 8/2017 | Bandixen | |
| 10,351,411 | B2 | 7/2019 | Ziesel | |
| 10,865,090 | B2 | 12/2020 | Ziesel | |
| 11,454,438 | B2 | 9/2022 | Njaastad | |
| 2006/0071015 | A1 | 4/2006 | Jablonski | |
| 2009/0314796 | A1 | 12/2009 | Graviss | |
| 2012/0067076 | A1 * | 3/2012 | Schroeder | B67D 1/0003 62/306 |
| 2019/0263651 | A1 | 8/2019 | Ziesel | |

* cited by examiner

COLD PLATE PRECHILL CIRCUIT

CROSS-REFERENCE TO RELATED APPLICATION

The present application claims priority of U.S. Provisional Patent Application No. 63/483,652, filed on Feb. 7, 2023, the contents of which is hereby incorporated by reference in entirety.

FIELD OF THE DISCLOSURE

The present disclosure relates to the field of beverage dispensing. More particularly, the present disclosure relates to a cold plate with a prechill circuit for plain and carbonated water.

BACKGROUND

There is a consumer preference for cold beverages as opposed to room-temperature beverages. Beverage dispensing machines often incorporate an ice dispensing system from which the consumer cup may be partially filled with ice and partially filled with beverage, whereby the beverage is cooled by the ice. Customer experience is improved with the dispensed beverage itself being chilled, thereby being sub-ambient temperature if presented without ice, providing lower temperature differential between the beverage and the ice, and promoting ice longevity, and lengthening the time for dilution of the beverage from melted ice.

Cold plates within a beverage dispensing system passively cool the carbonated and/or still water subsequently used to create the beverage by the mixing of one or more syrups with the diluent (carbonated or plain water). The cold plate is typically made of copper or aluminum and contains a series of lines run through the cold plate. The cold plate is positioned at the bottom of a hopper of the ice dispensing system. The ice for the ice dispensing system cools the cold plate. Carbonated water, plain water, and/or syrup flow through these lines to cool the individual components prior to combination into the final beverage.

U.S. Pat. No. 6,945,070 discloses an ice cooled cold plate and carbonator. A beverage cooling system includes a cold plate. The cold plate is provided with carbonator tank supports for mounting the carbonator tank in intimate heat exchange contact with the cold plate, with the carbonator tank being mounted sufficiently far away from heat exchange surface of the cold plate that it does not interfere with ice contacting the heat exchange surfaces. The arrangement is such that there is substantially no diminution a surface area of the cold palate that is available to receive ice. At the same time, the carbonator is effectively cooled through direct heat exchange contact with the cold plate.

BRIEF DISCLOSURE

An example of a cold plate includes a cold plate body. A tubing system is embedded within the cold plate body. The tubing system includes a prechill circuit, a plain water postchill circuit fluidly connected to the prechill circuit, and a carbonated water postchill circuit fluidly connected to the prechill circuit.

The tubing system may extend externally of the cold plate body between the prechill circuit and the plain water postchill circuit. The tubing system may extend externally of the cold plate body between the prechill circuit and the carbonated water postchill circuit. The cold plate body forms a top surface with a perimeter edge configured to retain ice on the top surface of cold plate body. The cold plate body supports are integrated to the cold plate body and is configured for thermal engagement with a carbonator. The cold plate body further includes a shoulder interior of the perimeter edge. The cold plate body is cast aluminum.

In examples, the total length of the plain water postchill circuit is longer than a total length of the carbonated water postchill circuit. The total length of the plain water postchill circuit may be about the same as a total length of the prechill circuit. The total length of the carbonated water postchill circuit may be about one half of the total length of the plain water postchill circuit. The plain water postchill circuit may be coplanar with the carbonated water postchill circuit. The tubing system may include a first layer within the cold plate body and include the prechill circuit. A second layer may be within the cold plate body and include the plain water postchill circuit and the carbonated water postchill circuit. The first layer is above the second layer in a vertical dimension. The tubing system may include a third layer within the cold plate body, the third layer includes flavoring tubes wherein the third layer is below the second layer in the vertical dimension. The prechill circuit includes a plurality of switchbacks extending across a width dimension of the tubing system, each switchback of the plurality extending a first distance in a length dimension of the tubing system. The plain water postchill circuit includes at least a first switchback extending a second distance in the length dimension of the tubing system and at least a second switchback extending a third distance in the length dimension. The first distance is greater than the second distance and the first distance is less than the third distance. The carbonated water postchill is a parallel offset from the at least one switchback of the plain water postchill circuit.

An example of a beverage dispenser includes a cold plate having a cold plate body and a tubing system embedded within the cold plate body. The tubing system includes a prechill circuit, a plain water postchill circuit fluidly connected to the prechill circuit, and a carbonated water postchill circuit fluidly connected to the prechill circuit. An ice hopper is arranged above the cold plate. The ice hopper is configured to deposit ice from the ice hopper onto the top surface of the cold plate. A carbonator is in thermal engagement with the cold plate. A three-way fitting is fludily connected between the prechill circuit, the carbonator, and the plain water postchill circuit.

Examples of the beverage dispenser may further include a carb pump fluidly connected upstream of the prechill circuit. A level sensor is positioned within the carbonator. The carb pump is configured to operate in response to an output from the level sensor. A bypass line fluidly bypasses the carb pump and the bypass line includes a shut off valve. The shut off valve is configured to operate in response to the output from the level sensor such that the shut off valve operates in a closed position when the carb pump is operating. The shut off valve may be configured to operate in an open condition in response to a dispense of plain water.

In other examples, a total length of the plain water postchill circuit is longer than a total length of the carbonated water postchill circuit. The tubing system may include a first layer within the cold plate body and includes the prechill circuit. The tubing system may include a second layer within the cold plate body and includes the plain water postchill circuit and the carbonated water postchill circuit. The plain water postchill circuit is coplanar with the carbonated water postchill circuit. The first layer is above the second layer in a vertical dimension. The first layer may be below the top surface of the cold plate. The tubing system includes a third layer within the cold plate body. The third layer includes flavoring tubes wherein the third layer is below the second layer in the vertical dimension. The prechill circuit may include a plurality of switchbacks extending across a width dimension of the tubing system. Each switchback of the plurality extends a first distance in a length dimension of the tubing system. The plain water postchill circuit includes at least a first switchback extends a second distance in the length dimension of the tubing system and at least a second switchback extending a third distance in the length dimension. The first distance is greater than the second distance and the first distance is less than the third distance.

DETAILED DISCLOSURE

Figure 1:
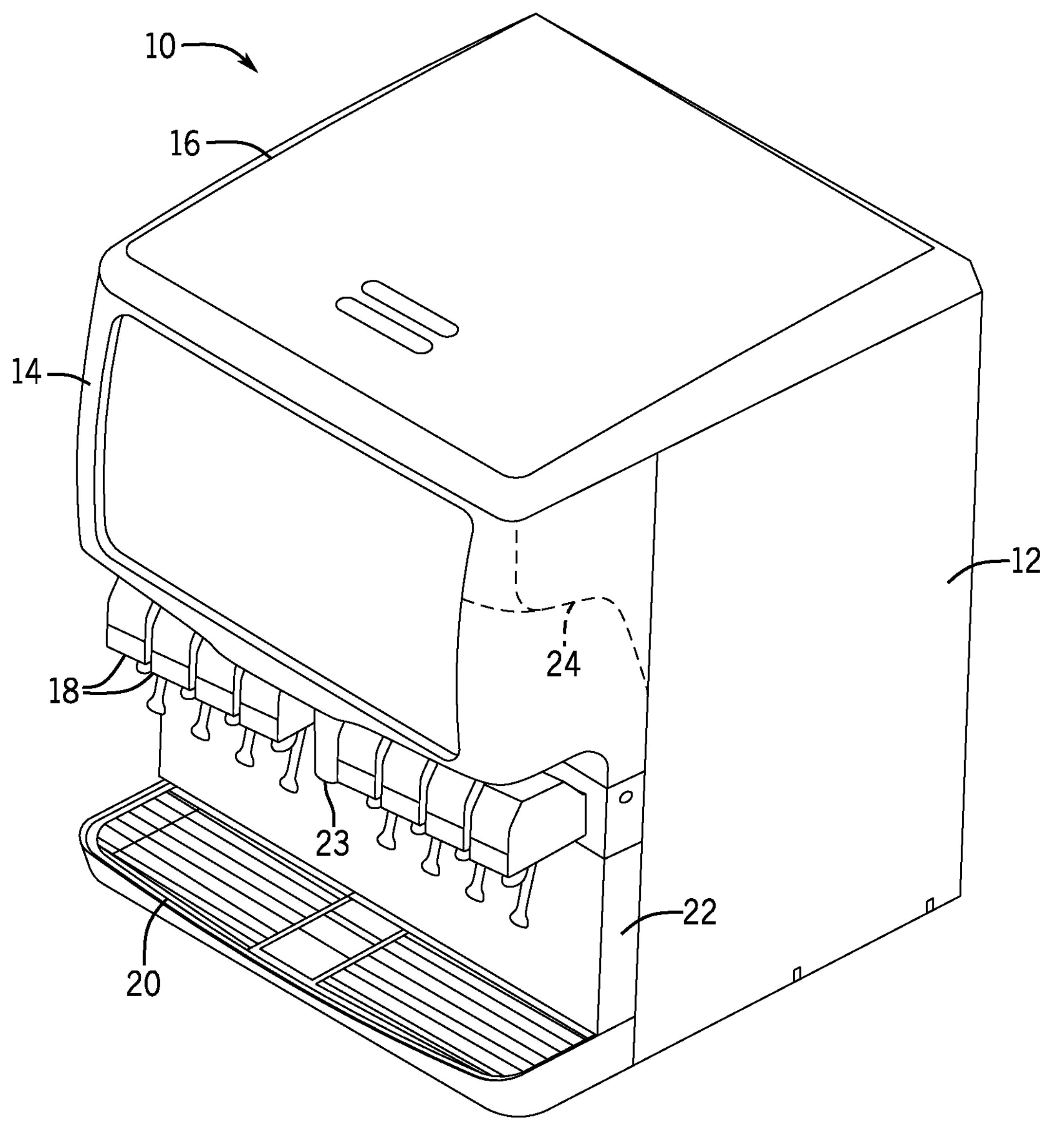
FIG. 1 depicts an example of a beverage dispenser.

An example of a combined beverage and ice dispenser 10 is presented in FIG. 1. The dispenser 10 includes an outer housing 12, a merchandising cover or graphical display 14 and a removable ice bin cover 16. One or more beverage dispensing valves 18 are secured to a front surface of the dispenser above a drip tray 20 and adjacent a splash panel 22. An ice dispensing chute 23 is also secured to the front surface of the dispenser centrally of the valves 18 and above the drip tray 20.

Figure 2:
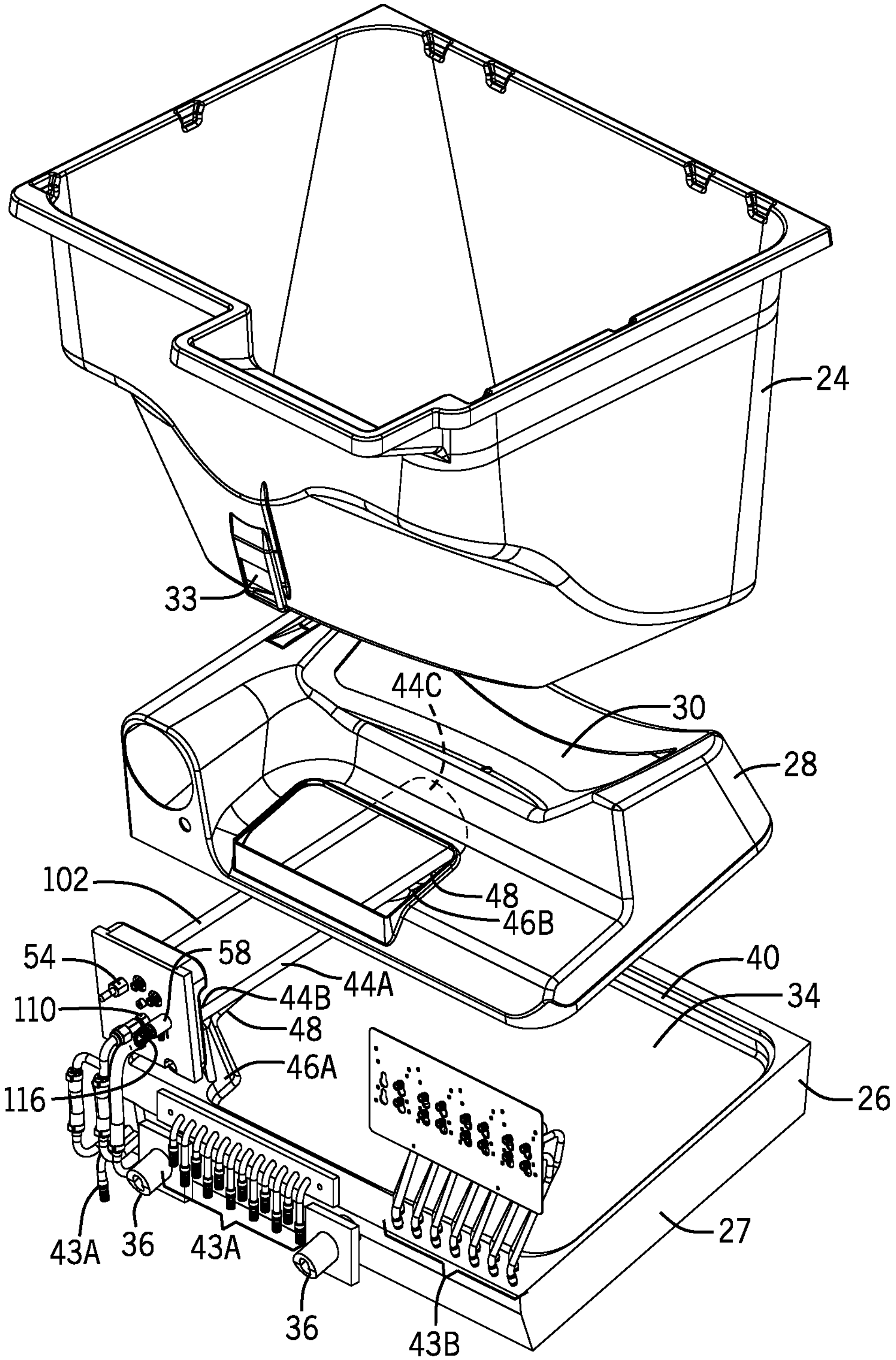
FIG. 2 is a partial exploded view of interior components of a beverage dispenser.

FIG. 2 is a partial exploded view of an example of the interior of a dispenser 10, for example with a merchandising cover or graphical display 14, outer housing 12, and ice bin cover 16 removed. The dispenser 10 has an ice retaining bin 24, a cold plate 26 and a cold plate cover 28. The cover 28 has an ice drop opening 30 that is secured in sealed relationship to a corresponding ice drop hole (not shown) in the bottom of the ice bin 24. The ice bin 24 is formed to have an angled front surface 32 for receiving an agitator motor that drives an agitator (neither shown) that resides within the ice bin 24. The ice bin 24 has an ice outlet opening 33 through which ice to be dispensed exits the bin for flow into, through and out of the chute 23 into a cup.

In operation, the ice bin 24 is filled with cubed ice by an operator. The agitator motor rotates the agitator in the ice retaining bin 24 to agitate and mix pieces of ice retained within the bin to prevent congealing and agglomeration of the ice into a mass of ice, to move and direct ice to and out of the bin outlet opening 33 and into the chute 23 for dispensing of the ice, and to maintain the ice in discrete free flowing form. Rotation of the agitator also causes some of the ice within the bin 24 to fall through to opening in the bottom of the ice bin 24 and through the corresponding opening 30 in the cold plate cover 28 onto a generally rectangular heat exchange top surface 34 of the cold plate 26. The cold plate 26 is typically positioned at an angle within the dispenser 10 to facilitate draining of ice melt water from the top surface 34 to and through cold plate drains 36. The cold plate heat exchange top surface 34 is defined within an upstanding perimeter edge 38 of the cold plate 26 and the cover 28 is secured to the cold plate along a perimeter shoulder 40 formed in the perimeter edge 38. The cover 28 encloses the cold plate and defines therewithin a cold plate compartment that resides beneath the ice retaining bin 24 and forms a protected ice retaining space above the cold plate heat exchange top surface 34.

The cold plate 26 includes a body 27 which is typically a cast material (e.g. aluminum) that surrounds tubing system 100 that includes a plurality of beverage lines that extend generally between fluid inlets 43A and fluid outlets 43B. The ice on the top surface 34 cools the cold plate 26 and the cold plate 26 is used in turn to cool fluid systems of the dispenser 10. The cold plate 26 cools beverage fluids flowing through the beverage lines 43 as described in further detail herein. The cold plate 26 is further used to cool a cylindrical carbonator 102. The carbonator 102 includes a central cylinder 102A and two end caps 102B and 102C secured to opposite ends of the central cylinder 102A. The cold plate 26 includes forward and rearward carbonator supports 46A and 46B that are formed as an integral part of the body of the cold plate and extend vertically upward from front and rear corners of the cold plate above and partially along one side of the perimeter edge 38. Being integral to the cold plate and of the same material of the cold plate, the carbonator supports 46A, 46B promote conductive thermal transfer between the cold plate and the carbonator, cooling the carbonator 102 and any liquid therein. In examples, the supports 46A, 46B may extend outside of the cold plate cover 28 and support the carbonator exterior of the cold plate cover 28, while in other examples, the cold plate cover 28 extends over the supports 46A, 46B, and the carbonator 102 is supported internal to the cold plate cover 28, with the carbonator 102 within the cold plate compartment. The cold plate supports 46A, 46B are further adapted for heat exchange contact with the carbonator 102 including but not limited to a concave arcuate heat exchange upper surface 48 exemplarily configured to correspond to a curved exterior of the central cylinder 102A of the carbonator 102.

The carbonator 102 produces carbonated water by mixing of water and carbon dioxide gas in intimate contact within the pressurized interior of the carbonator 102. The carbonator 102 has a water inlet 110 for connection to a source of potable water, a carbonated water outlet 116 for providing fluid connection to the valves 18, a carbon dioxide gas inlet 54 for connection to a source of pressurized carbon dioxide gas, a liquid level sensor connected to a control mechanism for controlling delivery of water into the carbonator 102 through the water inlet 110 as a function of the withdrawal of carbonated water through the outlet 116, and a pressure safety valve 58. Internally of the carbonator 102, the water inlet 110 connects to a water tube that is angled to direct water to flow out of an outlet into an upper interior zone of the carbonator that is filled with pressurized carbon dioxide gas and against an upper inner surface of the cylinder 102A. The outlet is designed to atomize the water to improve take-up of pressurized carbon dioxide gas into the water within the zone, and thereby to enhance the efficient carbonation of the water.

The inventors have observed that when the dispenser is configured to dispense both carbonated water and plain water (or beverages based on carbonated and/or plain water), the temperature of the carbonated water is lower than the temperature of the plain water, in part because of the chilling before and during the carbonation process. Beverage customers may prefer colder beverage temperatures. Additionally, customers may perceive a quality difference if temperature variation between plain water and carbonated water based beverages is noticed. The inventors have arrived at a cold plate arrangement with improved cooling of plain water and more consistent temperature performance between plain and carbonated water outputs.

Figure 3:
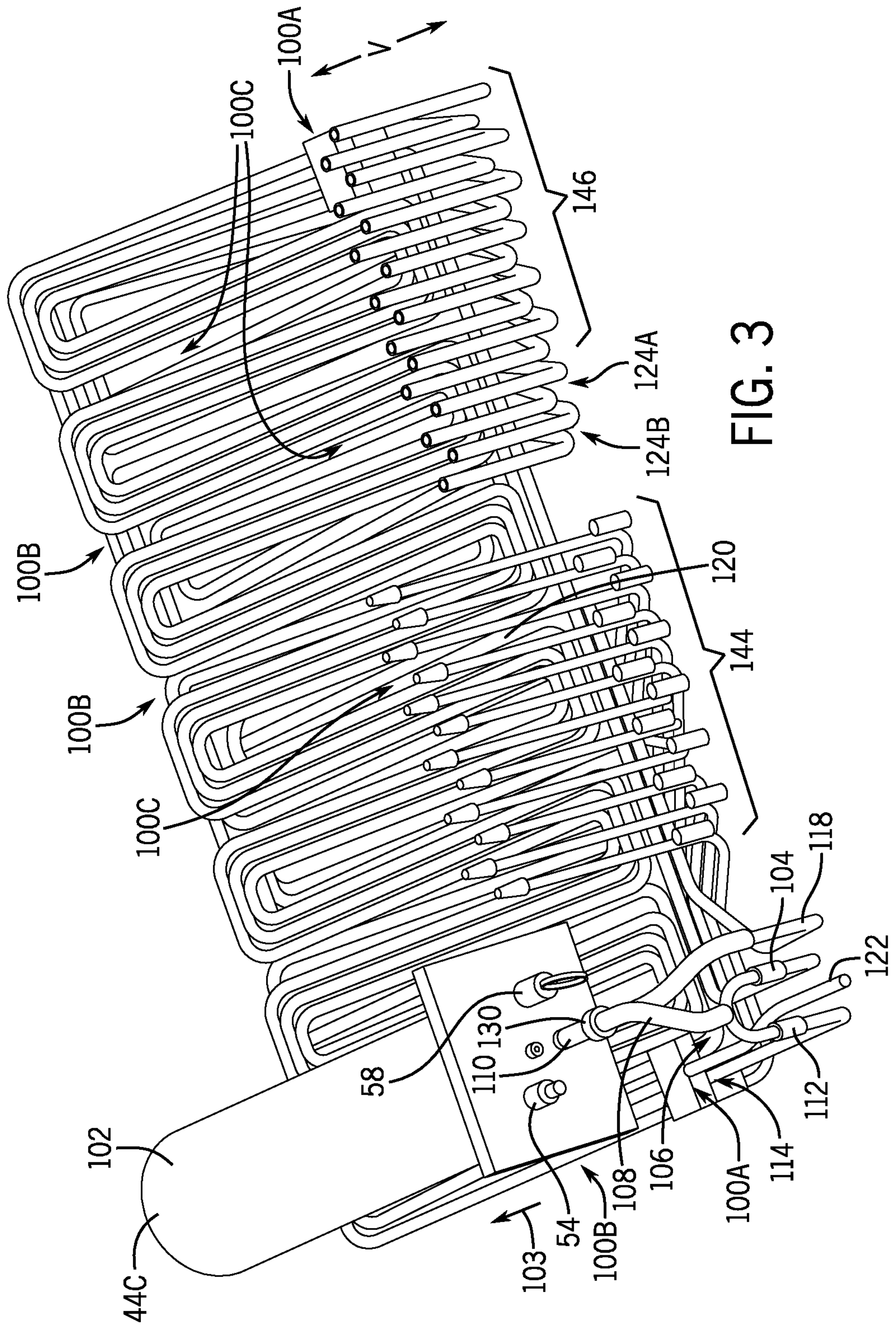
FIG. 3 is a perspective view of an example of a tubing system for a cold plate.

FIG. 3 is a perspective view of an example of the tubing system 100 as presently disclosed. It will be recognized that such tubing system 100 would be embedded, or partially embedded within the body 27 of the cold plate 26 (see FIG. 2), which as previously noted may be a monolithic casting of material, for example aluminum. The tubing system 100 includes a plurality of stacked layers of fluid lines between inlets and outlets thereof as explained herein. In addition to the tubing system 100, the carbonator 102 is provided that receives plain water as described in further detail herein and operates as described above to carbonate the plain water with carbon dioxide gas to produce carbonated water.

Plain water enters the tubing system 100 at water inlet 122 and flows through a prechill circuit 100A, exemplarily in the direction of arrow 103, before leaving a prechill outlet 104. The prechill outlet 104 is connected to a three-way fitting 106. One branch of the three-way fitting 106 is a carbonator supply line 108 connected to the water inlet 110 of the carbonator 102. A check valve 130 is positioned in the carbonator supply line 108 prior to the water inlet 110. The check valve 130 retains the pressure in the carbonator 102 and prevents pressure loss and equalization back into the prechill circuit 100A, as will be explained in further detail herein. The remaining branch of the three-way fitting 106 is a plain water supply line 112 connected to the inlet 114 of a plain water postchill circuit 100B, exemplarily in the direction of arrow 103. Plain water is chilled by conduction as it flows through the prechill circuit 100A, and subsequently chilled further by conduction as it flows through the plain water postchill circuit 100B. When a dispense of plain water, or a beverage that includes plain water, is initiated, the plain water, having been chilled by both the prechill circuit 100A and the postchill circuit 100B is dispensed through plain water outlet line 124A. As described above, the carbonator 102 operates to entrain carbon dioxide into plain water to produce carbonated water. Carbonated water exits an outlet 116 of the carbonator 102 into a carbonated water supply line 118. The carbonated water supply line 118 is connected to an inlet 120 of a carbonated water postchill circuit 100C.

Figure 5A:
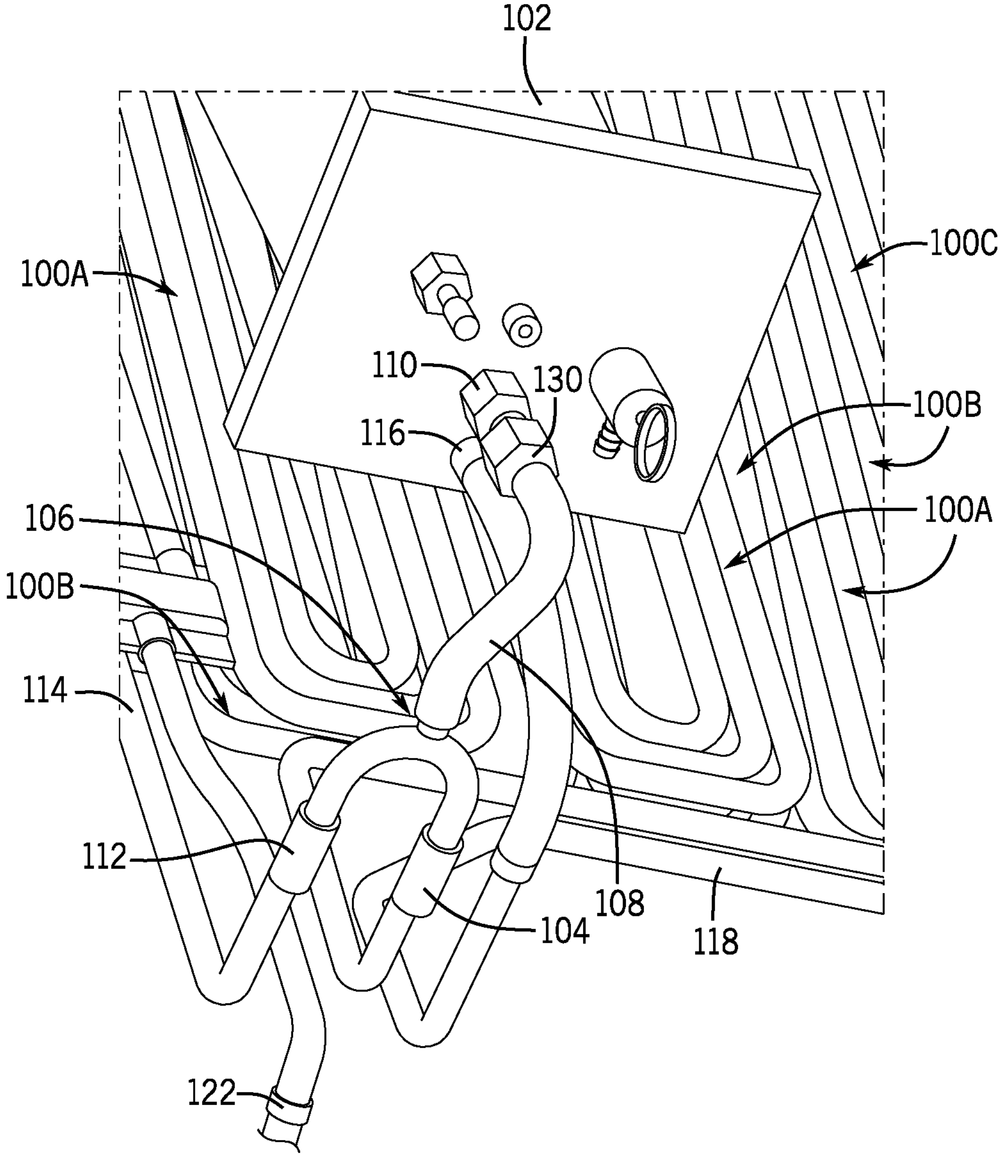
FIG. 5A is a detailed view of tubing connections about a carbonator, with the cold plate removed for clarity.
Figure 5B:
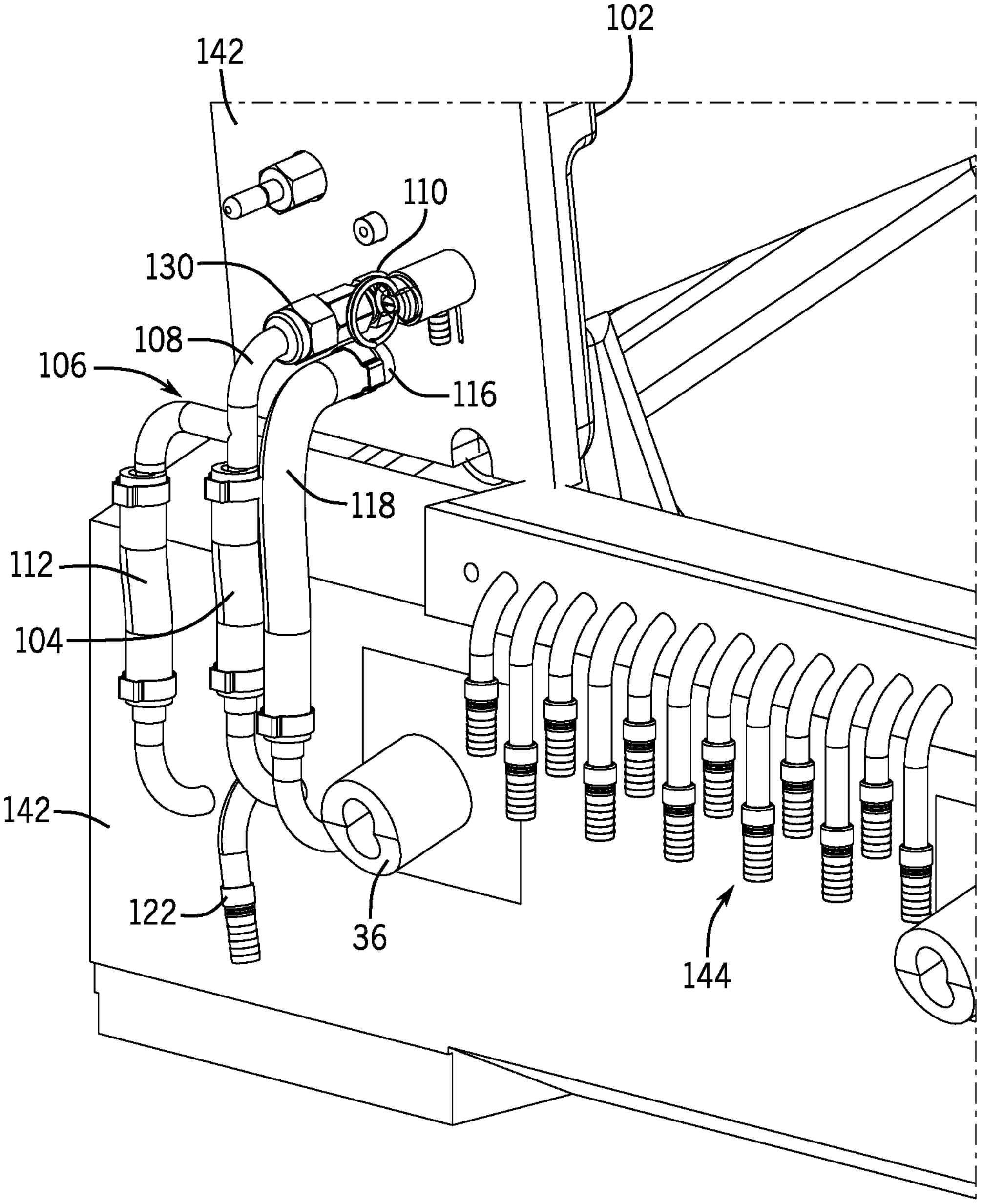
FIG. 5B is a detailed view of tubing connections about a carbonator, with the cold plate shown for context.

FIGS. 5A and 5B provide detailed perspective views of the region surrounding the carbonator 102, including portions of the tubing system 100 as described above. It is recognized that references numbers as described above reference the same components in these views as well. FIG. 5A is a detailed version of that shown in FIG. 3, while FIG. 5B depicts the tubing system 100 embedded within the cold plate 26 and further surrounded by foam insulation 142. Therefore, only portions of the tubing system 100, as indicated in FIGS. 5B, are exposed.

Returning to FIG. 3, the plain water postchill circuit 100B is positioned in a layer below, in a vertical dimension V, from the prechill circuit 100A. The carbonated water postchill circuit 100C is exemplarily positioned in a layer below the prechill circuit 100A in the vertical dimension V. In the example depicted herein, the pain water postchill circuit 100B and the carbonated water postchill circuit 100C are coplanar and within the same plane.

Figure 4:
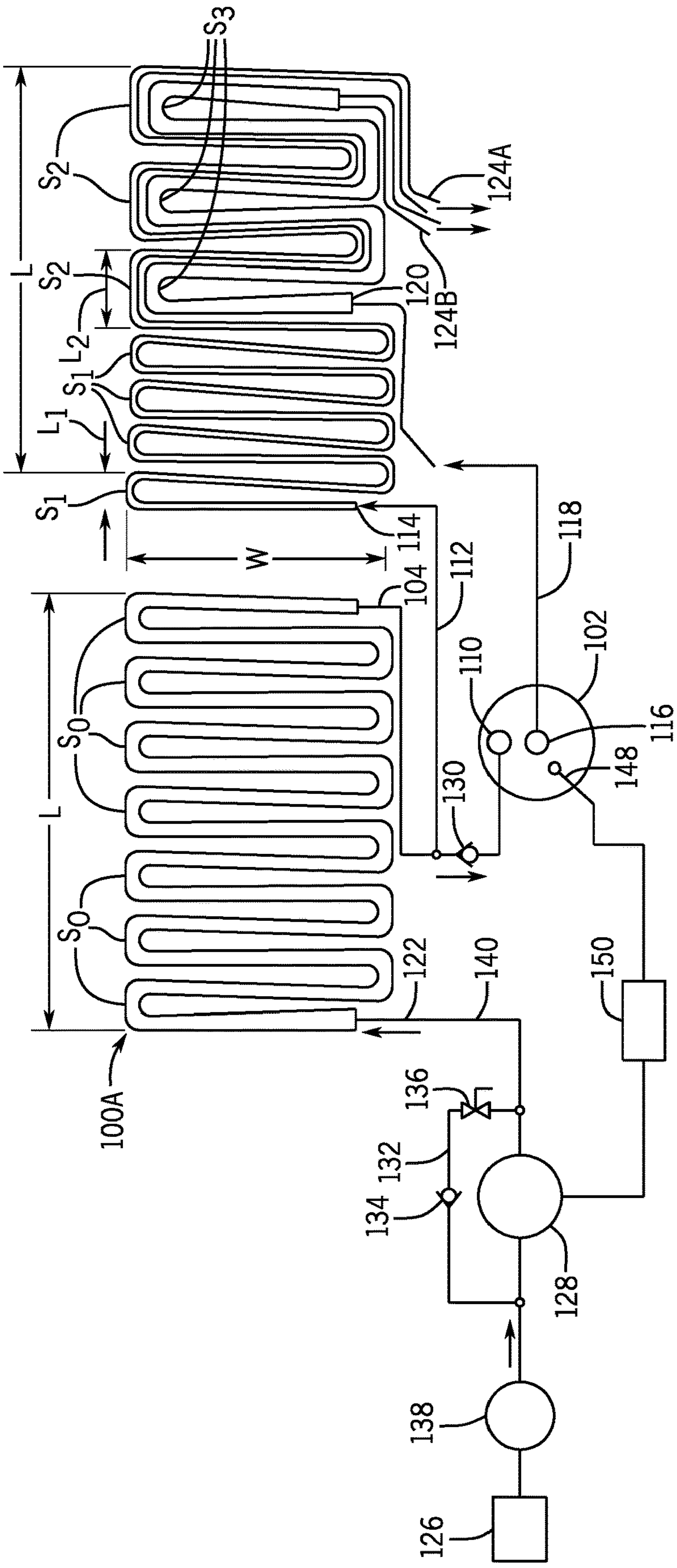
FIG. 4 is a schematic diagram of an example of a tubing system for the cold plate.

FIG. 4, which is a schematic view of the system as shown in FIG. 3, exemplarily depicts a first layer of the tubing system represented by the prechill circuit 100A and a second layer of the tubing system 100 represented by the both the plain water postchill circuit 100B and the carbonated water postchill circuit 100C. This represents features of the tubing system 100 which may be obscured in the perspective view of FIG. 3. Exemplarily, the prechill circuit 100A includes a series of switchbacks $S_0$ between the width dimension W of the tubing system 100 and extending along the length dimension L of the tubing system 100. Exemplarily, the prechill circuit 100A exemplarily includes seven switchbacks $S_0$ with even lengths in the length dimension L. It will be recognized that other variations and arrangements of the prechill circuit 100A may be used while remaining within the scope of the present disclosure.

The second layer of the tubing system 100, represented by the combined plain water postchill circuit 100B and the carbonated water prechill circuit 100C in a coplanar relationship. The second layer occupies a similar footprint as the first layer, extending for a length L in the length dimension and a width W in the width dimension. The plain water postchill circuit 100B, similar to the prechill circuit 100A, includes seven switchbacks, however, the plain water postchill circuit 100B exemplarily includes two switchback arrangements. Switchbacks $S_1$ have a length $L_1$. In an example, the switchbacks $S_1$ are shorter in the L dimension than the switchbacks $S_0$ of the prechill circuit 100A, and shorter than switchbacks $S_2$ as will be described in further detail herein. The plain water postchill circuit 100B further includes switchbacks $S_2$ which have a length $L_2$. Length $L_2$ of switchbacks $S_2$ is longer than either of Switchbacks $S_0$ or $S_1$. However, the smaller length of switchbacks $S_2$ and greater length of switchbacks $S_2$ roughly balance so that the total length of the tubing of the plain water postchill circuit 100B may exemplarily be about the same (e.g. +/−10%) length as the prechill circuit 100A.

The greater distance $L_2$ provided by switchbacks $S_2$ creates space for the switchbacks $S_3$ of the carbonated water postchill circuit 100C to fit in a parallel offset relationship to switchbacks $S_2$ of the plain water postchill circuit 100B. It will be recognized that alternating ends of switchbacks $S_2/S_3$ are internal to one another. In an example, a total length of the carbonated water postchill circuit 100C is about (e.g. +/−10%) one half the total length of the plain water postchill circuit 100B.

Carbonated water from the carbonator 102 water flows through the carbonated water postchill circuit 100C upon the initiation of a dispense of carbonated water or a beverage that includes carbonated water, for example by opening a carbonated water dispense valve (not depicted), carbonated water is dispensed through a carbonated water outlet line 124B. The carbonated water, having been cooled by conduction in the prechill circuit 100A, cooled while in the carbonator 102, and further cooled by conduction in the carbonated water postchill circtuit 100C, prior to dispense through the carbonated water outlet line 124B. Syrup inlets 144 provide flavoring syrup through tubing in the cold plate, the flavoring tubing, while partially obscured in FIG. 3 and not included in FIG. 4 for the sake of simplification, may be arranged in a third layer of tubing within the tubing system 100, exemplarily below in the vertical dimension V both the layer of the prechill circuit 100A and the layer of the combined plain water postchill circuit 100B and the carbonated water postchill circuit 100C. However, it will be recognized that other arrangements of the flavoring syrup tubes may be used, included but not limited to the use of a fourth layer within the cold plate. The flavoring syrup, chilled by conductive contact with the cold plate is subsequently dispensed through syrup outlets 146.

FIG. 4 also depicts the fluid control components of the dispenser as may be used to achieve the operation of fluid flow within the tubing system 100 as described. Water is received to the dispenser from a water source 126. Depending upon the utility water pressure or consistency of the utility water pressure for the water source 126 at the location of the dispenser 10, the dispenser 10 may include a booster pump 138 to provide additional or consistent water pressure into the tubing system 100.

The carbonator 102 includes a water level probe 148 this probe provides a determination of a threshold level or amount of (carbonated) water in the carbonator 102. When the water level falls below the position of the probe, a control signal is produced. The control signal maybe provided directly to a carb pump 128, while in other examples, the signal from the probe 148 is provided to a controller 150. The controller 150 is exemplarily, but not limited to: a control circuit, programmable logic, or a microprocessor, and produces the control signal in response to the signal from the probe 148. A carb pump 128 receive the control signal and operates in response the control signal to provide additional water pressure to the prechill circuit 100A to maintain a minimum pressure of the water introduced to the carbonator 102. A bypass line 132 with a check valve 134 and a shut off valve 136 operate to selectively bypass the carb pump 128, when the additional system pressure is not needed. In such example, the shut off valve 136 is normally open, but is operated to close during operation of the carb pump 128 to fill the carbonator 102. When the carbonator is filled to a sufficient level indicated by the probe, the carb pump 128 stops operation and the shut off valve 136 opens. When system operates to dispense plain water, the pressure of the water in from the water source and/or booster pump by way of the bypass line 132 exemplarily meets sufficient operational pressure for plain water dispensing, while water volume is not also being withdrawn from the carbonator and/or carbonated water postchill circuit 100C. Plain water from the carb pump 128 and/or through the bypass line 132 flows through water inlet 122 to the prechill circuit 100A. Operation otherwise proceeds as described above.

Figure 6A:
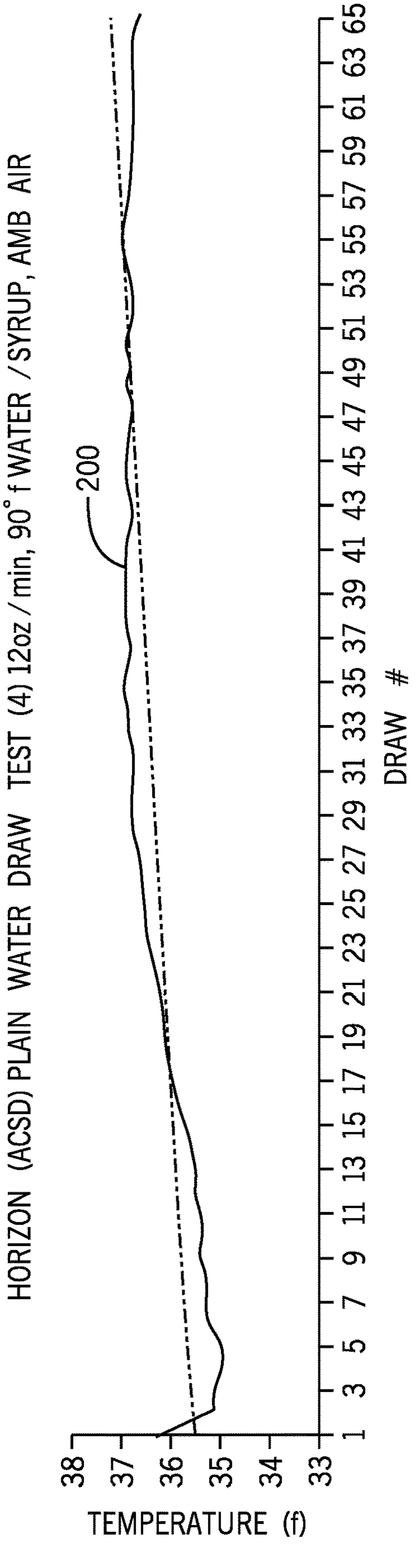
FIGS. 6A and 6B are graphs of example water temperature measurements.
Figure 6B:
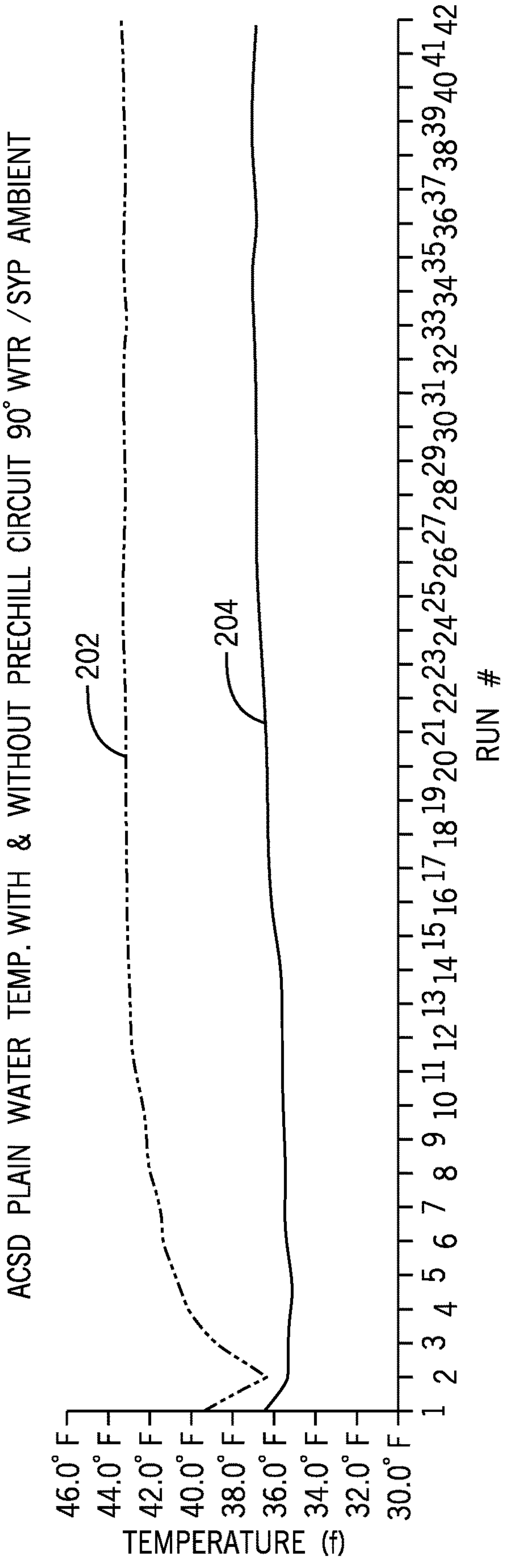

FIGS. 6A and 6B present examples of temperature measurement graphs for an operational test for the temperature of dispensed carbonated water and plain water. FIG. 6A presents a graph 200 of the measured temperatures of carbonated water during a series of dispenses. FIG. 6B presents a graph 202 of measured temperatures of plain water during a series of dispenses through a prior design as well as a graph 204 of measured temperatures of plain water during a series of dispenses through the cold plate design as disclosed. A comparison of the graphs shows a decrease in the plain water temperature, and a plain water temperature more consistent with that of the carbonated water temperature.

U.S. patent application Ser. No. 18/537,399, entitled "Ice Dispensers" and which is incorporated by reference herein in its entirety, includes additional disclosure regarding an ice hopper and dispensing system, with which the presently disclosed cold-plate may exemplarily be used. This is not limiting on the scope available implementations of the described cold plate and rather a person of ordinary skill in the art will recognize other variations and implementations of the cold plate as disclosed in view of the present disclosure.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A beverage dispenser comprising:

a cold plate having a cold plate body with a top surface and a tubing system embedded within the cold plate body, wherein the tubing system comprises a prechill circuit, a plain water postchill circuit fluidly connected to the prechill circuit, and a carbonated water postchill circuit fluidly connected to the prechill circuit;

an ice hopper arranged above the cold plate, the ice hopper configured to deposit ice from the ice hopper onto the top surface of the cold plate;

a carbonator in thermal engagement with the cold plate;

a three-way fitting fludily connected between the prechill circuit, the carbonator, and the plain water postchill circuit;

a carb pump fluidly connected upstream of the prechill circuit;

a level sensor positioned within the carbonator, wherein the carb pump is configured to operate in response to an output from the level sensor; and a bypass line, fluidly bypassing the carb pump, the bypass line comprising a shut off valve;

wherein the shut off valve is configured to operate in response to the output from the level sensor such that the shut off valve operates in a closed position when the carb pump is operating.

2. The beverage dispenser of claim 1, further comprising a carb pump fluidly connected upstream of the prechill circuit;

a level sensor positioned within the carbonator, wherein the carb pump is configured to operate in response to an output from the level sensor; and a bypass line, fluidly bypassing the carb pump, the bypass line comprising a shut off valve;

wherein the shut off valve is configured to operate in response to the output from the level sensor such that the shut off valve operates in a closed position when the carb pump is operating.

3. The beverage dispenser of claim 1, wherein the shut off valve is configured to operate in an open condition in response to a dispense of plain water.

4. The beverage dispenser of claim 1, wherein a total length of the plain water postchill circuit is longer than a total length of the carbonated water postchill circuit.

5. The beverage dispenser of claim 4, wherein the tubing system comprising:

a first layer within the cold plate body and comprising the prechill circuit; and a second layer within the cold plate body and comprising the plain water postchill circuit and the carbonated water postchill circuit, wherein the plain water postchill circuit is coplanar with the carbonated water postchill circuit;

wherein the first layer is above the second layer in a vertical dimension.

6. The beverage dispenser of claim 5, wherein the first layer is below the top surface of the cold plate and the tubing system comprises a third layer within the cold plate body, the third layer comprising flavoring tubes wherein the third layer is below the second layer in the vertical dimension.

7. The beverage dispenser claim 6, wherein the prechill circuit comprises a plurality of switchbacks extending across a width dimension of the tubing system, each switchback of the plurality extending a first distance in a length dimension of the tubing system;

wherein the plain water postchill circuit comprises at least a first switchback extending a second distance in the length dimension of the tubing system and at least a second switchback extending a third distance in the length dimension; and wherein the first distance is greater than the second distance and the first distance is less than the third distance.

8. The beverage dispenser of claim 7, wherein the carbonated water postchill circuit is a parallel offset from the second switchback of the plain water postchill circuit.

9. The beverage dispenser of claim 1, wherein a total length of the plain water postchill circuit is the same as a total length of the prechill circuit.

10. The beverage dispenser of claim 1, wherein a total length of the carbonated water postchill circuit is about one half of the total length of the plain water postchill circuit.

11. The beverage dispenser of claim 1, wherein the tubing system extends externally of the cold plate body between the prechill circuit and the plain water postchill circuit and extends externally of the cold plate body between the prechill circuit and the carbonated water postchill circuit.

12. The beverage dispenser of claim 1, wherein the cold plate body comprises a perimeter edge about the top surface configured to retain ice on the top surface of the cold plate body.

13. The beverage dispenser of claim 12, wherein the cold plate body comprises supports integrated to the cold plate body and is configured for thermal engagement with a carbonator; and wherein the cold plate body further comprises a shoulder interior of the perimeter edge.

14. The beverage dispenser of claim 1, wherein the cold plate body is cast aluminum.

* * * * *